Patented May 7, 1940

2,199,597

UNITED STATES PATENT OFFICE 2,199,597

MANUFACTURE OF LAMINATED SHEETS

Archibald Renfrew and William Elliott Frew Gates, Norton-on-Tees, England, assignors to Imperial Chemical Industries Limited, a corporation of Great Britain No Drawing. Application December 29, 1936, Serial No. 118,170. In Great Britain January 8, 1936

3 Claims. (Cl. 154—40)

This invention relates to a method of producing laminated sheets. Hitherto such articles have generally been made by coating or impregnating a base material with a solution of resin in a solvent removing the solvent generally by the application of heat super-imposing two or more layers of the treated base material and laminating by heat and pressure. Occasionally solid resins, usually of the thermo-hardening type, have been sprinkled between the laminae before pressing, and the use of thermoplastic resins has been suggested.

The object of this invention is to disclose a new method of making laminated sheets. A further object is to disclose a method of making the sheets which will be cheaper and easier to operate. Further objects will be disclosed or apparent in the following description.

These objects are attained by impregnating or coating a base material with an adhesive material to which a powder capable of being formed by heat and pressure or a powder which in the presence of the adhesive can be converted into a body capable of being formed by heat and pressure (hereinafter referred to as the "bonding powder") is caused to stick. The treated base material sheets are then assembled, with or without further treatment and laminated by heat and pressure. Alternatively a single sheet can be folded over itself to form the lamination.

In a preferred embodiment the adhesive is itself capable of being formed by heat and pressure or is convertible in the presence of the powder into such a body. In another preferred embodiment of the invention the adhesive material comprises a resin, made by the polymerisation of a monomer containing the group $CH_2=C=$ dissolved in the monomer itself. In some cases it may be necessary to treat the base material after the adhesive agent has been applied, for instance, heat may be used to bring about a chemical reaction or to remove excessive solvent, or it may be treated to a mechanical treatment to remove excess of dusting powder and to ensure a level surface.

The following examples illustrate but do not limit the invention.

*Example 1*

A fabric of a fine linen sheeting is passed through a bath containing 15% of polymerised methyl methacrylate dissolved in methyl methacrylate monomer in which is also dissolved 2% benzoyl peroxide and 1% of Spirit Red III (Colour Index No. 258) calculated on the weight of monomer. The fabric is then passed through the nip of a mangle to express excess of the solution, and is then caused to traverse a bath containing a dyed powder consisting of comminuted polyisopropyl methacrylate. The fine powder adheres to both sides of the linen fabric which is then passed between two revolving beaters when excess loose powder is knocked off and falls back into the powder bath. The coated fabric is further brushed so as to leave a fine level surface. It is then lapped into layers and a polished metal plate inserted between each sixth layer. Four such assemblies, i. e. 24 laminae and 5 metal plates, are then laminated at a temperature of about 140° C. under a pressure of 1-2 tons per square inch and after heating for 5 minutes are cooled under pressure to 40° C.

*Example 2*

A medium shirting cotton fabric is coated with a boiled linseed oil varnish consisting of 36 parts varnish and 2 parts manganese linoleate and is then passed through a powder bath of 60 parts of poly-methyl methacrylate powder and 40 parts finely ground mica powder. After beating, the cloth is hung up by festooning in a chamber heated to 40° C. for 3 days when it is laminated as in Example 1.

*Example 3*

A fabric of jaconette is coated by spreading both sides of the fabric with a solution of viscose of about the consistency of thick treacle. After squeezing out excess of the viscose, the cloth is passed through a powder bath of 80 parts fine granular methyl methacrylate polymer mixed with 20 parts finely ground cork dust and dried thoroughly. Lamination is effected by heating at 140° C. and under a pressure of 1 ton per square inch for one minute, releasing the pressure for 5 seconds and pressing for a further 3 minutes under a pressure of 2 tons per square inch. The assembly is cooled to 60° C.

*Example 4*

An absorbent paper is passed through a bath containing an aqueous syrup of urea formaldehyde resin and immediately after squeezing out excess syrup is passed through a bath of finely powdered urea formaldehyde moulding resin. It is dried in a chamber at 40° C. for 20 minutes, beaten, brushed and laminated as for Example 3.

Alternative base materials to those given in the above examples are: sheets of paper, fabric, or metal, or any combination of these.

Alternative adhesive agents are: the various drying oils, solutions of gums, natural or synthetic resins or cellulose derivatives in water or organic solvents, solution of gelatine, glue or starch in water, and solutions of cellulose in any of its various solvents. Dyes, pigments and agents intended to affect the properties of the solid bonding powder, may also be added. The adhesive agent is preferably capable of being formed by heat and pressure.

Many methods are available for causing the bonding powder to adhere to the sticky coating on the base material, e. g. the resin may be dusted on, or the sticky base material may be passed under a roller fixed beneath the surface of a bulk of resin powder in a container. Amongst the bonding powders which can be used, we may mention the polymerised derivatives of acrylic acid, its homologues, polymerised vinyl derivatives, rubber in its natural, modified, or synthetic forms, urea formaldehyde condensation products, phenol formaldehyde condensation products, cellulose derivatives, natural resins, shellac and bitumen. The bonding powders may contain dyes, pigments, fillers, plasticising agents, or other bodies designed to modify their appearance and/or properties. It is desirable to subject the sticky base material coated with resin powder to a mechanical treatment which effects the removal of the surplus resin powder and leaves behind a level surface. If desired, a further layer of adhesive material and resin may be applied. Before assembly and lamination, the sheet may be treated with a chemical reagent with or without subsequent drying. It is sometimes desirable to calender the treated sheet material. The process of lamination follows the lines well known to those skilled in the art. The pressure may have to be maintained while the assembly cools down in the press.

By working according to the methods of our invention, it is possible to introduce easily and cheaply, large amounts of bonding powders or mixtures of bonding powders, resulting in increased strength, better appearance and improved resistance to chemical attack due to the absence of large amounts of solvent and to the use of resins which are generally fully polymerised.

As many apparently widely different embodiments of this invention may be made without departing from the spirit and scope thereof, it is to be understood that we do not limit ourselves to the specific embodiments thereof except as defined in the appended claims.

We claim:

1. Steps in a process for making laminated sheets which comprise treating the base materials, which it is desired to mold into laminated sheets, in sheet form with an adhesive comprising essentially a methacrylic acid ester monomer-polymer mixture, and then causing to adhere thereto a polymeric ester of methacrylic acid in powdered form.

2. Steps in a process for making laminated sheets which comprise treating the base materials, which it is desired to mold into laminated sheets, in sheet form with an adhesive comprising essentially polymerized methyl methacrylate in a solution of methyl methacrylate monomer, and then causing to adhere thereto polymeric methyl methacrylate in powdered form.

3. Steps in a process for making laminated sheets which comprise treating the base materials, which it is desired to mold into laminated sheets, in sheet form with an adhesive comprising essentially a polymerized methyl methacrylate in a solution of methyl methacrylate monomer, and then causing to adhere thereto polymeric isopropyl methacrylate in powdered form.

ARCHIBALD RENFREW.
WILLIAM ELLIOTT FREW GATES.